United States Patent
Frydman et al.

(10) Patent No.: US 10,225,686 B2
(45) Date of Patent: Mar. 5, 2019

(54) PASSIVE POSITIONING BASED ON DIRECTIONAL TRANSMISSIONS

(71) Applicant: QUALCOMM Incorporated, San Diego, CA (US)

(72) Inventors: Javier Frydman, Tel-Mond (IL); Alecsander Petru Eitan, Haifa (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 15/423,464

(22) Filed: Feb. 2, 2017

(65) Prior Publication Data

US 2017/0223496 A1    Aug. 3, 2017

Related U.S. Application Data

(60) Provisional application No. 62/290,917, filed on Feb. 3, 2016.

(51) Int. Cl.
| | |
|---|---|
| *H04W 4/02* | (2018.01) |
| *H04W 8/00* | (2009.01) |
| *H04W 64/00* | (2009.01) |
| *H04B 7/06* | (2006.01) |

(52) U.S. Cl.
CPC .............. *H04W 4/02* (2013.01); *H04B 7/063* (2013.01); *H04B 7/0695* (2013.01); *H04W 8/005* (2013.01); *H04W 64/00* (2013.01)

(58) Field of Classification Search
CPC ....... H04W 4/02; H04W 8/005; H04W 64/00; H04W 72/046; H04B 7/061

USPC ............ 455/456.1, 456.3, 456.5, 457, 452.2; 370/509–510, 512
See application file for complete search history.

(56) References Cited

U.S. PATENT DOCUMENTS

| | | | |
|---|---|---|---|
| 2014/0357292 A1* | 12/2014 | Walma .................. | H04W 64/00 455/456.1 |
| 2015/0126224 A1* | 5/2015 | Takatsuji ............... | G01C 21/20 455/456.3 |
| 2015/0230263 A1* | 8/2015 | Roy .................. | H04W 36/0083 455/452.2 |
| 2015/0256972 A1* | 9/2015 | Markhovsky ........... | H04W 4/90 455/456.1 |
| 2016/0105229 A1 | 4/2016 | Trainin et al. | |
| 2016/0202344 A1* | 7/2016 | Sanderovich ............. | G01S 5/06 455/456.1 |

(Continued)

FOREIGN PATENT DOCUMENTS

| | | |
|---|---|---|
| DE | 10031495 A1 | 1/2002 |
| EP | 2239913 A1 | 10/2010 |

(Continued)

OTHER PUBLICATIONS

Partial International Search Report—PCT/US2017/016400—ISA/EPO—dated May 12, 2017.

(Continued)

*Primary Examiner* — Congvan Tran
(74) *Attorney, Agent, or Firm* — Patterson & Sheridan, L.L.P. Qualcomm

(57) ABSTRACT

Certain aspects of the present disclosure generally relate to passive positioning based on directional transmissions, such as directional beacons transmitted during a sector sweep procedure.

14 Claims, 17 Drawing Sheets

(56) References Cited

U.S. PATENT DOCUMENTS

| | | | | |
|---|---|---|---|---|
| 2016/0205501 A1* | 7/2016 | Lee | ...................... | H04W 8/005 |
| | | | | 455/457 |
| 2016/0285522 A1* | 9/2016 | Kasher | ................... | H04B 7/043 |
| 2017/0085306 A1* | 3/2017 | Cariou | ................ | H04B 7/0452 |

FOREIGN PATENT DOCUMENTS

| | | |
|---|---|---|
| GB | 2475171 A | 5/2011 |
| KR | 20140057908 A | 5/2014 |
| WO | WO-2008087600 A2 | 7/2008 |
| WO | WO-2014036150 A1 | 3/2014 |
| WO | WO-2015145217 A1 | 10/2015 |

OTHER PUBLICATIONS

International Search Report and Written Opinion—PCT/US2017/016400—ISA/EPO—dated Aug. 14, 2017.

* cited by examiner

PASSIVE POSITIONING BASED ON DIRECTIONAL TRANSMISSIONS

CLAIM OF PRIORITY UNDER 35 U.S.C. § 119

The present Application for Patent claims benefit of U.S. Provisional Patent Application Ser. No. 62/290,917, filed Feb. 3, 2016, assigned to the assignee hereof and hereby expressly incorporated by reference herein.

BACKGROUND

Field of the Disclosure

Certain aspects of the present disclosure generally relate to wireless communications and, more particularly, to passive positioning based on frames send during beamforming training.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple STAs to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide an apparatus for wireless communications. The apparatus generally includes an interface configured to obtain: a first frame from a first wireless node during a first sector sweep procedure, a second frame from a second wireless node during a second sector sweep procedure, information indicating a time of arrival (TOA) of a third frame at a third wireless node, and information indicating a TOA of a fourth frame at the third wireless node; and a processing system configured to estimate a first position of the apparatus relative to the first and second wireless nodes based on at least one of a TOA of the first frame at the apparatus, a TOA of the second frame at the apparatus, the TOA of the third frame at the third wireless node, or the TOA of the fourth frame at the third wireless node.

Certain aspects of the present disclosure provide an apparatus for wireless communications. The apparatus generally includes a first interface configured to obtain: at least a first frame from a first wireless node during a first sector sweep procedure and at least a second frame from a second wireless node during a second sector sweep procedure, a processing system configured to generate one or more frames with information indicating a time of arrival (TOA) at the apparatus of the first frame and a TOA at the apparatus of the second frame, and a second interface configured to output the one or more frames for transmission.

Certain aspects also provide various other apparatus, methods and means capable of providing the functionality described above.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
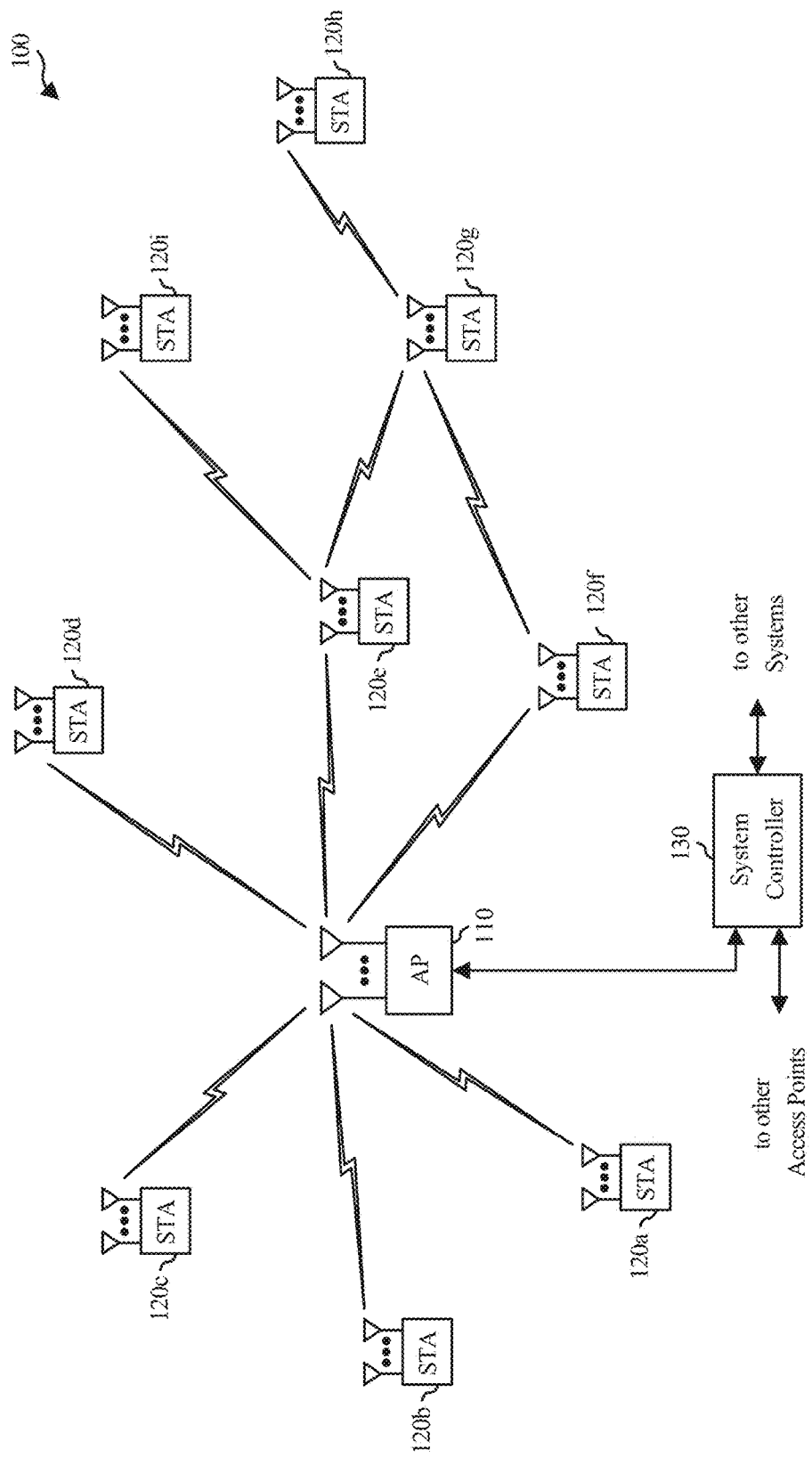
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to performing beamforming for a sector, corresponding to a received beamforming frame, that is selected as corresponding to a line of sight (LOS). The selection of the beamforming frame may be based on a relative time of fight (RTOF) of the frame.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple stations. A TDMA system may allow multiple stations to share the same frequency channel by dividing the transmission signal into different time slots, each time slot being assigned to different stations. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, an access point 110 may perform beamforming training to improve signal quality during communication with a station (STA) 120. The beamforming training may be performed using a MIMO transmission scheme.

The system 100 may be, for example, a multiple-access multiple-input multiple-output (MIMO) system 100 with access points and stations. For simplicity, only one access point 110 is shown in FIG. 1. An access point is generally a fixed station that communicates with the stations and may also be referred to as a base station or some other terminology. A STA may be fixed or mobile and may also be referred to as a mobile station, a wireless device, or some other terminology. Access point 110 may communicate with one or more STAs 120 at any given moment on the downlink and uplink. The downlink (i.e., forward link) is the communication link from the access point 110 to the STAs, and the uplink (i.e., reverse link) is the communication link from the STAs to the access point 110. A STA may also communicate peer-to-peer with another STA.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe STAs 120 capable of communicating via Spatial Division Multiple Access (SDMA), for certain aspects, the STAs 120 may also include some STA that do not support SDMA. Thus, for such aspects, an AP 110 may be configured to communicate with both SDMA and non-SDMA STAs. This approach may conveniently allow older versions of STAs ("legacy" stations) to remain deployed in an enterprise, extending their useful lifetime, while allowing newer SDMA STAs to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected STAs 120 collectively represents the multiple-output for downlink transmissions and the multiple-input for uplink transmissions. For pure SDMA, it is desired to have $N_{ap} \geq K \geq 1$ if the data symbol streams for the K STAs are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected STA transmits user-specific data to and/or receives user-specific data from the access point 110. In general, each selected STA may be equipped with one or multiple antennas (i.e., $N_{ut} \geq 1$) The K selected STAs can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the STAs 120 share the same frequency channel by dividing transmission/reception into different time slots, each time slot being assigned to different STA 120.

Figure 2:
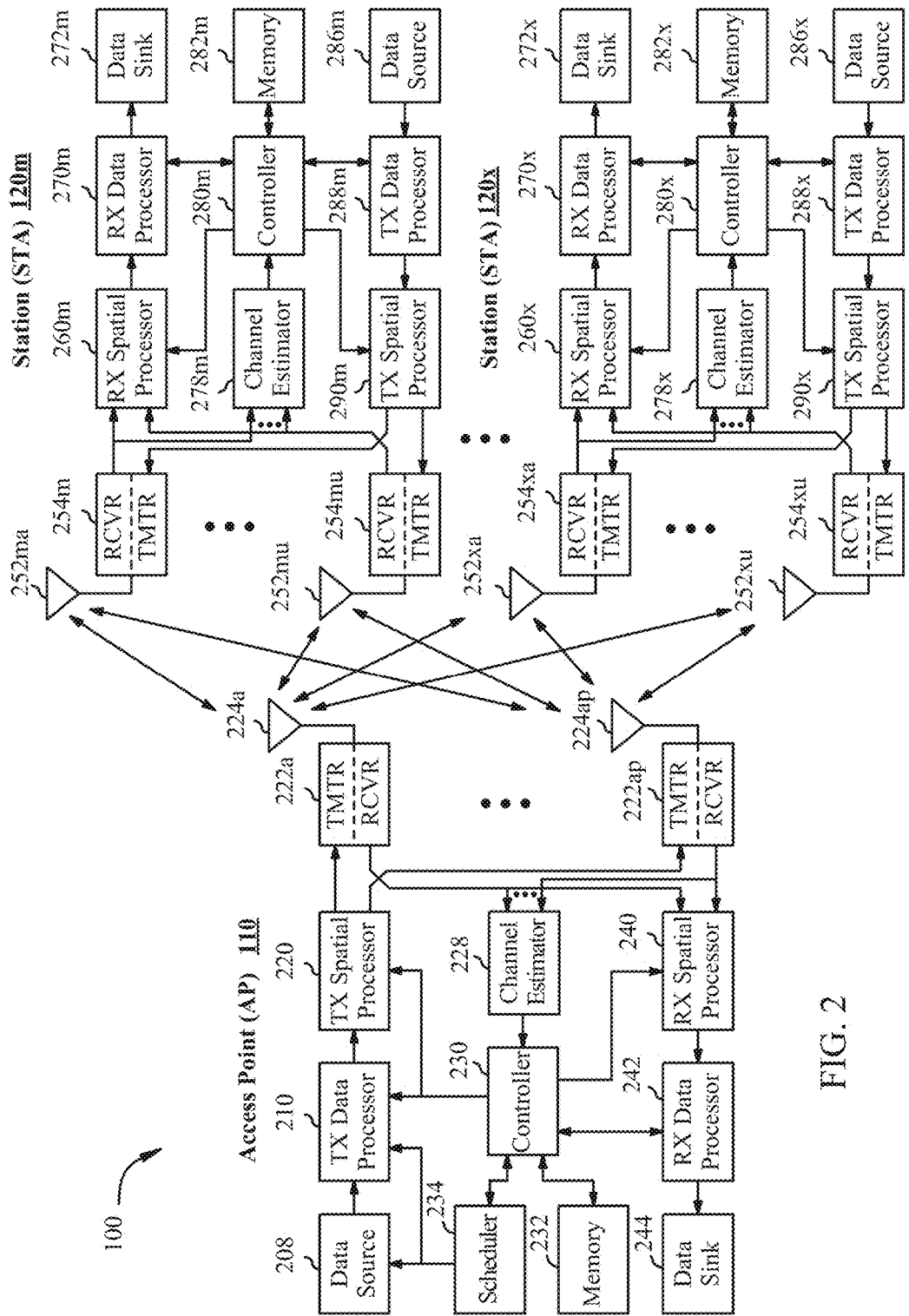
FIG. 2 is a block diagram of an example access point (AP) and STAs, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, transceiver (Tx/Rx) 222, processors 210, 220, 240, 242, and/or controller 230 or antenna 252, Tx/Rx 254, processors 260, 270, 288, and 290, and/or controller 280 may be used to perform the operations described herein and illustrated with reference to FIGS. 9 and 10.

FIG. 2 illustrates a block diagram of access point 110 two STAs 120m and 120x in a MIMO system 100. The access point 110 is equipped with $N_t$ antennas 224a through 224ap. STA 120m is equipped with $N_{ut,m}$ antennas 252ma through 252mu, and STA 120x is equipped with $N_{ut,x}$ antennas 252xa through 252xu. The access point 110 is a transmitting entity for the downlink and a receiving entity for the uplink. Each STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ STA are selected for simultaneous transmission on the uplink, $N_{dn}$ STAs are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point 110 and STA.

On the uplink, at each STA 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) of transceiver 254 receives and processes (e.g., converts to analog, amplifies, filters, and frequency upconverts) a respective transmit symbol stream to generate an uplink signal. $N_{ut,m}$ transmitter units of transceivers 254 provide $N_{ut,m}$ uplink signals for transmission from $N_{ut,m}$ antennas 252 to the access point 110.

$N_{up}$ STAs may be scheduled for simultaneous transmission on the uplink. Each of these STAs performs spatial processing on its data symbol stream and transmits its set of transmit symbol streams on the uplink to the access point 110.

At access point 110, $N_{ap}$ antennas 224a through 224ap receive the uplink signals from all $N_{up}$ STAs transmitting on the uplink. Each antenna 224 provides a received signal to a respective receiver unit (RCVR) of transceiver 222. Each receiver unit of transceiver 222 performs processing complementary to that performed by transmitter unit of transceiver 254 and provides a received symbol stream. An RX spatial processor 240 performs receiver spatial processing on the $N_{ap}$ received symbol streams from $N_{ap}$ receiver units of transceivers 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ STAs scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides $N_{dn}$ downlink data symbol streams for the $N_{dn}$ STAs. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit of transceiver 222 receives and processes a respective transmit symbol stream to generate a downlink signal. $N_{ap}$ transmitter units of transceivers 222 providing $N_{ap}$ downlink signals for transmission from $N_{ap}$ antennas 224 to the STAs. The decoded data for each STA may be provided to a data sink 272 for storage and/or a controller 280 for further processing.

At each STA 120, $N_{ut,m}$ antennas 252 receive the $N_{ap}$ downlink signals from access point 110. Each receiver unit of transceiver 254 processes a received signal from an associated antenna 252 and provides a received symbol stream. An RX spatial processor 260 performs receiver spatial processing on $N_{ut,m}$ received symbol streams from $N_{ut,m}$ receiver units of transceivers 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each STA typically derives the spatial filter matrix for the STA based on the downlink channel response matrix $H_{dn,m}$ for that STA. Controller 230 derives the spatial filter matrix for the access point 110 based on the effective uplink channel response matrix $H_{up,eff}$. Controller 280 for each STA may send feedback information (e.g., the downlink and/or uplink eigenvectors, eigenvalues, SNR estimates, and so on) to the access point 110. Controllers 230 and 280 also control the operation of various processing units at access point 110 and STA 120, respectively.

Figure 3:
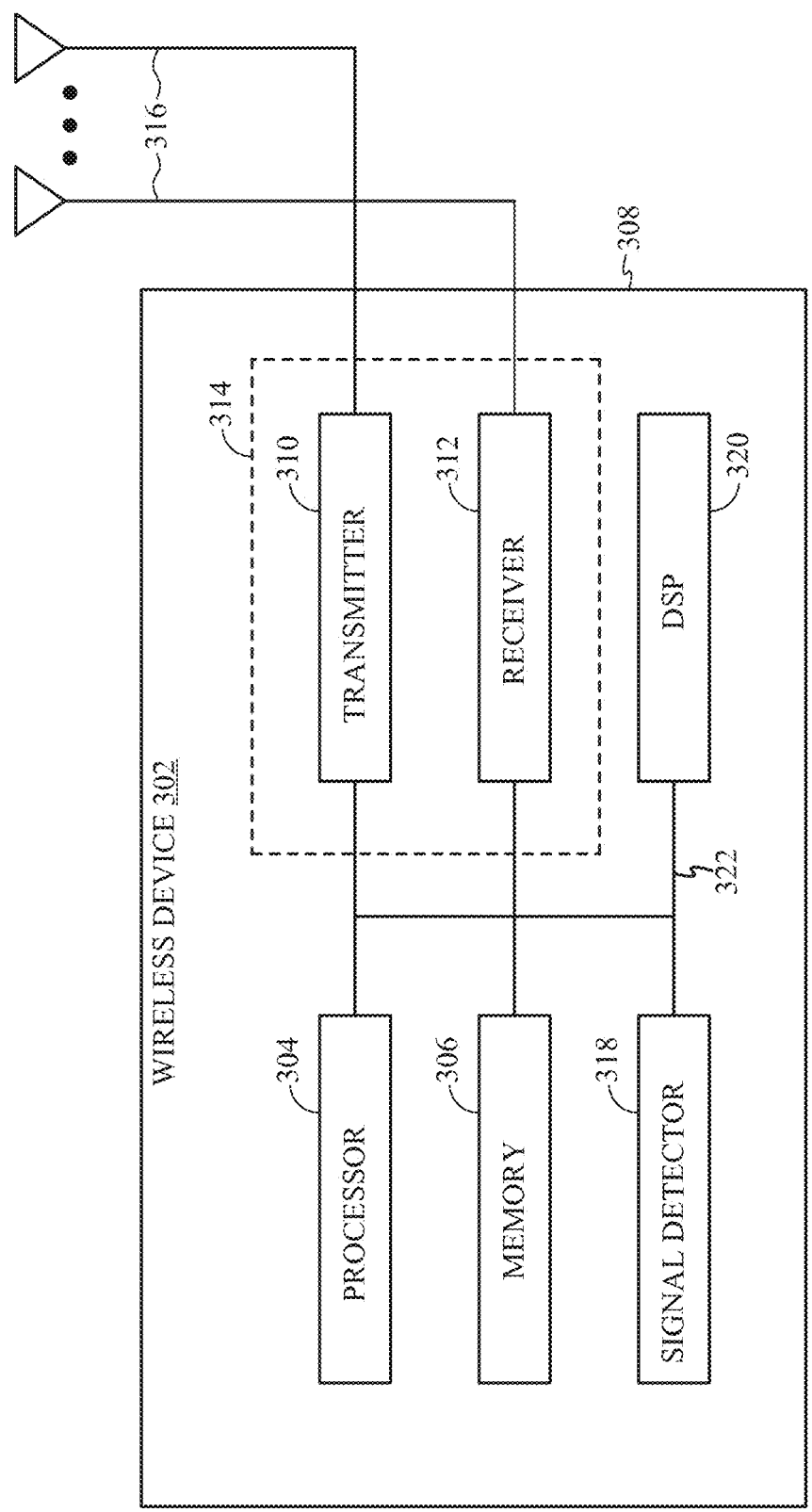
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 800 and FIG. 8, respectively. The wireless device 302 may be an access point 110 or a STA 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Beamforming (BF) generally refers to a process used to control the directionality of transmission and reception of radio signals. BF may be used to determine relative rotation of devices (e.g., APs and/or non-AP STAs) based on training signals. In some cases, the training signals may be transmitted as part of a beamforming (BF) training process according to, for example, the IEEE 802.11ad standard. Knowing the relative rotation may allow each device to optimize antenna settings for transmit and reception.

Figure 4:
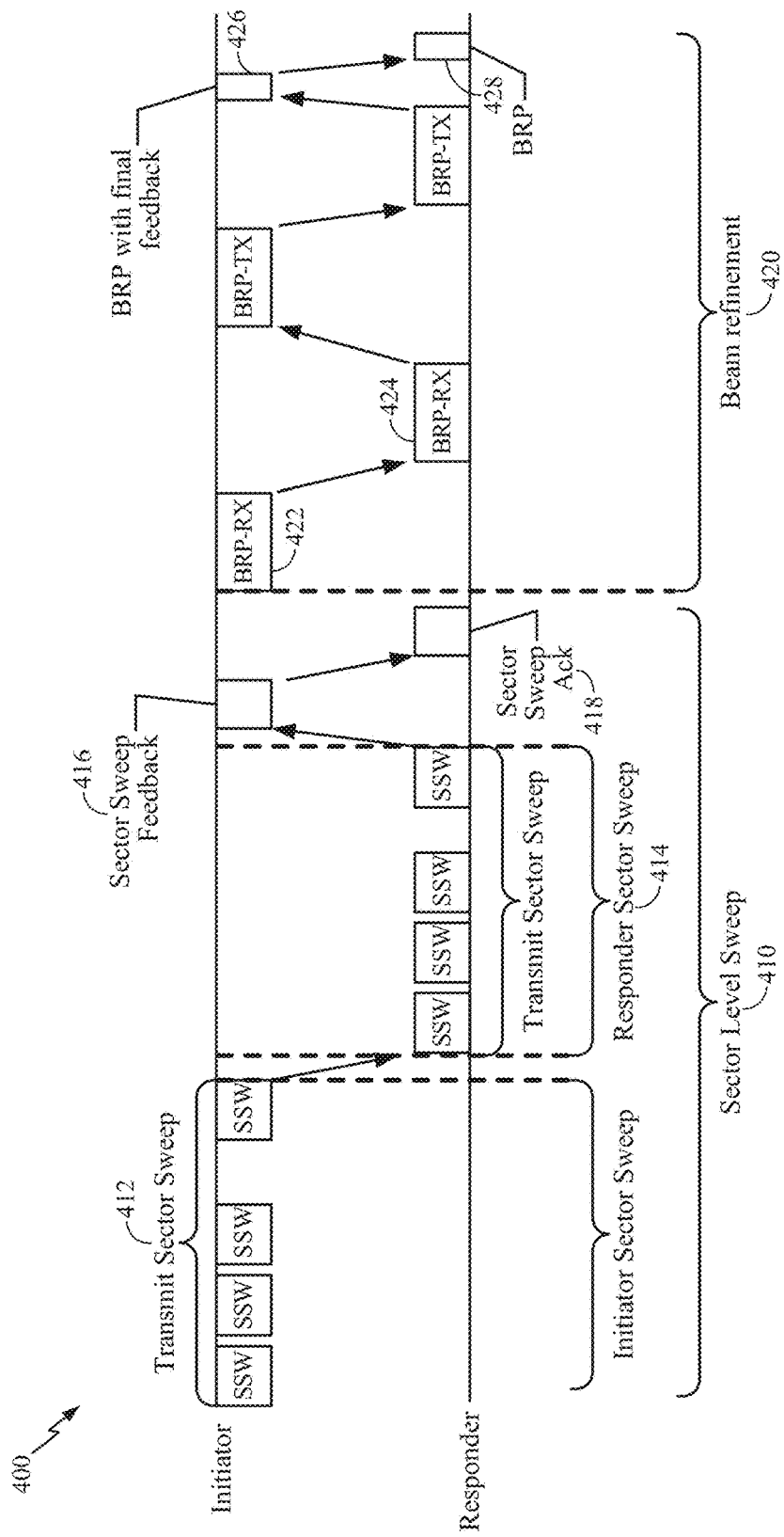
FIG. 4 is an example call flow illustrating a beam training phase, in accordance with certain aspects of the present disclosure.

An example BF training process is illustrated in FIG. 4. The BF process is typically employed by a pair of millimeter-wave stations, e.g., a receiver and transmitter. Each pairing of the stations achieves the necessary link budget for subsequent communication among those network devices. As such, BF training typically involves a bidirectional sequence of BF training frame transmissions that uses sector sweep and provides the necessary signals to allow each station to determine appropriate antenna system settings for both transmission and reception. After the successful completion of BF training, a (e.g., millimeter-wave) communication link may be established.

The beamforming process can help address an issue that exists for communication at the millimeter-wave spectrum, which is its high path loss. As such, a large number of antennas are place at each transceiver to exploit the beamforming gain for extending communication range. That is, the same signal is sent from each antenna in an array, but at slightly different times.

As shown in the example BF training process 400 illustrated in FIG. 4, the BF process may include a sector level sweep (SLS) phase 410 and a subsequent beam refinement stage 420. In the SLS phase 410, one of the STAs acts as an initiator by conducting an initiator sector sweep 412, which is followed by a transmit sector sweep 414 by the responding station (where the responding station conducts a responder sector sweep). A sector generally refers to either a transmit antenna pattern or a receive antenna pattern corresponding to a particular sector ID. As mentioned above, a station may have a transceiver that includes one or more active antennas in an antenna array (e.g., a phased antenna array).

The SLS phase 410 typically concludes after an initiating station receives sector sweep feedback 416 and sends a sector acknowledgement (ACK) 418, thereby establishing BF. Each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional Multi-gigabit (DMG) beacon frames via different sectors, in which a sweep is performed between consecutive transmissions.

During the subsequent beam refinement stage 420, each station can sweep a sequence of transmissions (422 and 424), separated by a short beamforming interframe space (SBIFS) interval, in which the antenna configuration at the transmitter or receiver can be changed between transmissions, culminating in the exchange of final BRP feedback 426 and 428. In this manner, beam refinement is a process where a station can improve its antenna configuration (or antenna weight vector) both for transmission and reception. That is, each antenna includes an antenna weight vector (AWV), which further includes a vector of weights describing the excitation (amplitude and phase) for each element of an antenna array.

Example Passive Positioning

Knowing the position of a station, or group of stations, may be useful for a wide variety of reasons. For example, position information may be used by applications running on the devices, targeted service delivery, navigation, and/or network load balancing.

Different types of positioning approaches may be broadly classified as active or passive. An active approach generally involves a device (actively) sending requests to one or more reference nodes and measuring round trip time (RTT) to determine relative distance based on timestamps in the requests and corresponding responses. Given the relative distances between a station and different nodes at known locations, the station may use an algorithm to estimate an absolute position.

There are tradeoffs between active and passive positioning. As mentioned above, active positioning using round trip time (RTT) measurements typically rely on packets interchanged between a station (STA) and Access Point (APs) which consumes network (NW) capacity resources. As an example, in a stadium with, for example, a 1000 APs and 100,000 users, traditional active RTT approaches to positioning may generate a great overload on the system, with much interference.

Passive Positioning (PP) may help alleviate issues associated with active positioning, while still providing positioning services to a large number of users without overloading the network. One example of a PP technique may be applied in networks that utilize omni-directional transmissions (e.g., 802.11 b/g/n/ac). These PP techniques may provide a station with capability to deduce its position in passive mode without associating with APs.

Figure 5:
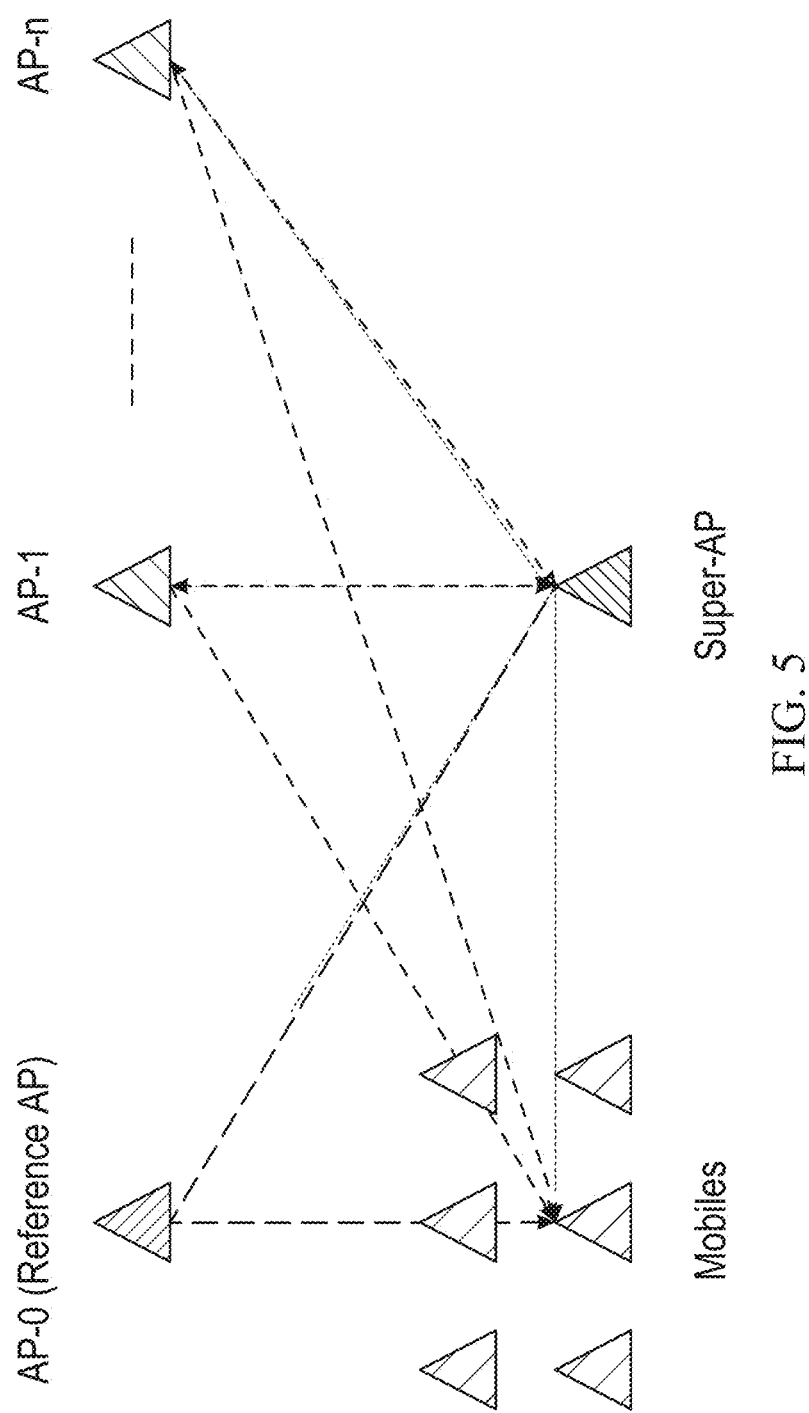
FIG. 5 is a diagram illustrating example passive positioning.
Figure 6:
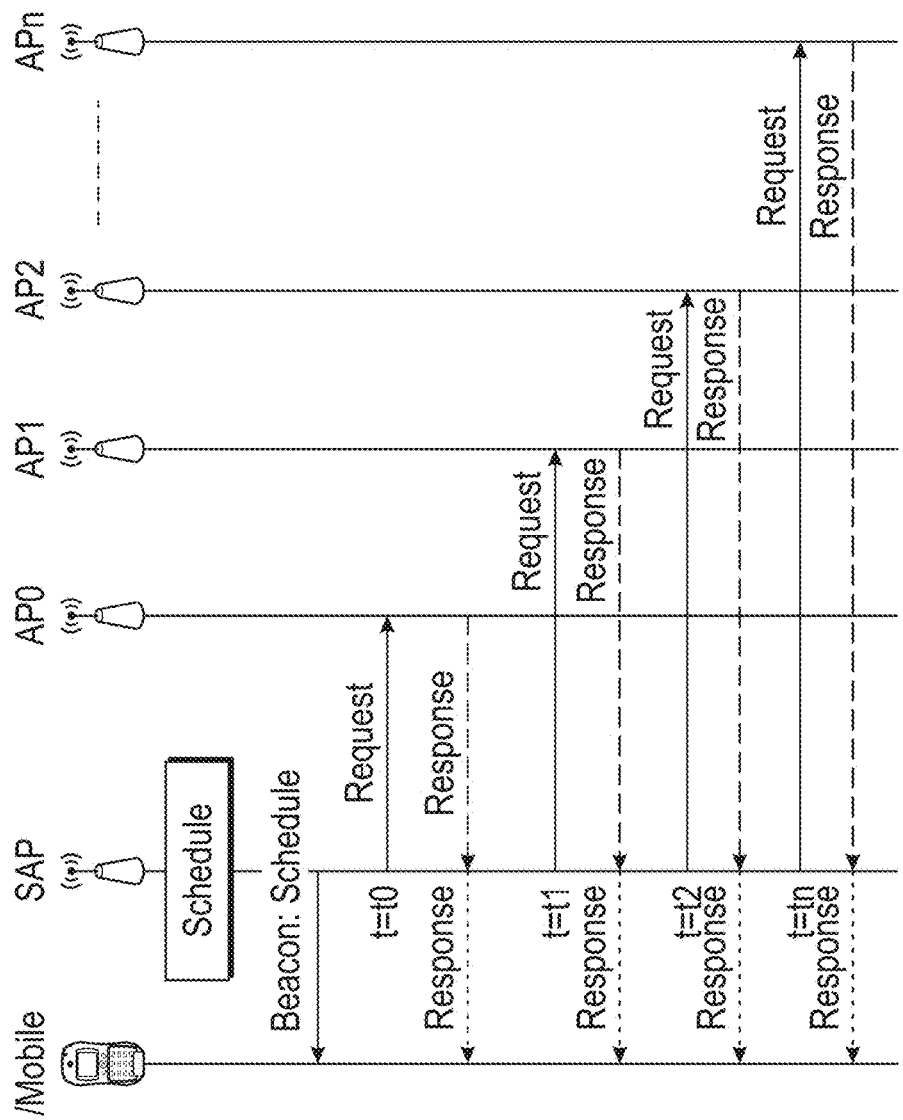
FIG. 6 is a call flow diagram illustrating example passive positioning.

FIG. 5 is a diagram illustrating example passive positioning for a network with N APs, labeled AP-0, AP-1 . . . , AP-n, with a coordinating or manager AP referred to herein as a "Super-AP" or SAP. Each AP (AP-0:AP-n) generally has the capability to advertise its location in a broadcast channel (e.g., via a beacon). Each AP (AP-0:AP-n) also has the capability to provide a STA a known signal transmitted at a known instance for him (AP time of deliver or TOD instance) to deduce the TOA (Time of Arrival). Each STA may generally have the capability to receive the broadcast messages from the APs and the capability to measure the TOA of the AP TOD instances. The SAP generally has the capability to synchronize with the AP's TOD instances. The TOA of these instances may be measured by regular RTT procedures, such as Fine Timing Measurement (FTM). The SAP may broadcast its own measured TOAs/RTT for the different APs. The exchange of messages for this type of passive procedure may be illustrated by the call flow diagram shown in FIG. 6.

In some cases, the positioning may be performed with measured TOA values to generate a "Double Difference" metric. As can be seen by the set of equations below, the double difference technique may result in cancelling out of various clock drift factors that appear in the "single difference" calculations shown below. The following example assumes a station is measuring a double difference metric using TOA measurements a reference AP (AP0) and another AP (APi). AP0 may transmit a packet at time t0, while a APi transmits a packet at time $t_i$, (with the times unknown to the station). The SAP and station may then measure time of arrival for both packets (from AP0 and APi as follows:

$$TOA_{SAP}^0 = (1+\partial_{SAP}^0)t_0 + c^{-1}d_{SAP}^0 + \theta_{SAP} + n_{SAP}^0$$

$$TOA_{SAP}^i = (1+\partial_{SAP}^i)t_i + c^{-1}d_{SAP}^i + \theta_{SAP} + n_{SAP}^i$$

$$TOA_{mob}^0 = (1+\partial_{mob}^0)t_0 + c^{-1}d_{mob}^0 + \theta_{mob} + n_{mob}^0$$

$$TOA_{mob}^i = (1+\partial_{mob}^i)t_i + c^{-1}d_{mob}^i + \theta_{mob} + n_{mob}^i$$

then the station may calculate a double difference metric, as follows:

$$DD_i^{means} = c(TOA_{SAP}^i - TOA_{SAP}^0) - c(1+\hat{\partial}_{mob})^{-1}(TOA_{mob}^i - TOA_{mob}^0)$$

Where:
- $t_i$ is TOD of APi.
- $d_{mob}{}^i$ and $d_{SAP}{}^i$ are the real distances between APi to mobile and SAP respectively.
- $n_{mob}{}^i$ and $n_{SAP}{}^i$ are the measurements noise from APi to mobile and SAP respectively.
- $\partial_{mob}{}^i$ and $\partial_{SAP}{}^i$ is the clock drift between APi and mobile or SAP respectively
- $\hat{\partial}_{mob}{}^i$ and $\hat{\partial}_{SAP}{}^i$ is the estimated clock drift
- $\theta_{mob}$ and $\theta_{SAP}$ is the objective time base offset for mob and SAP and where $DD_i{}^{meas}$ is the Double-Difference distance measurement between mobile and APi.

Figure 7:
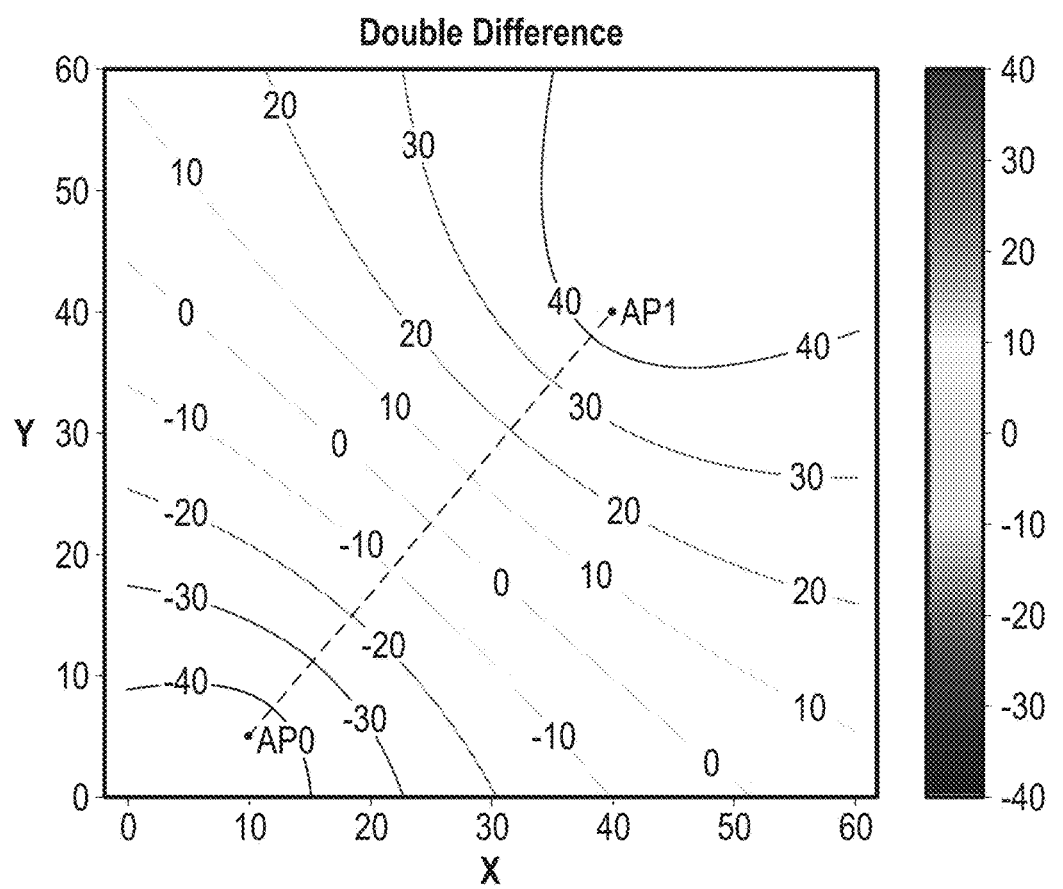
FIG. 7 illustrates example double difference plots between two access points.

Given that APi's and SAP locations are known, $DD_i{}^{meas}$ provides a line/plane hypothesis of possible station locations/positions as illustrated in FIG. 7. By taking a DD measurement for another pair (e.g., AP0 and APj), the station may estimate it's possible position based on an intersection of multiple AP's/SAP $DD_i{}^{meas}$ lines (as will be described in greater detail below with reference to FIG. 15).

Certain networks may present challenges to using this type of passive positioning approach. For example, 802.11ad networks are implemented in the 60 GHz band and communication in this frequency may suffer from very low penetration, higher decay factor (relative to 2.5/5 GHz networks), as attenuation of the transmitted signal is greater for the same distance. In order to overcome these drawbacks, such systems utilize antenna arrays for applying beam forming and compensating for this attenuation by the resulting antenna array gain.

As such, however, the link between 2 entities (e.g., an AP and STA) is very directed/directional, resulting in less probability of another entity (AP/STA) is able to tap/listen to this communication, which may make conventional passive positioning described above difficult. In 802.11ad, the transmission is directed whilst the receiving side has an "omni" receive sector for facilitating the beam-forming training flow.

Figure 8:
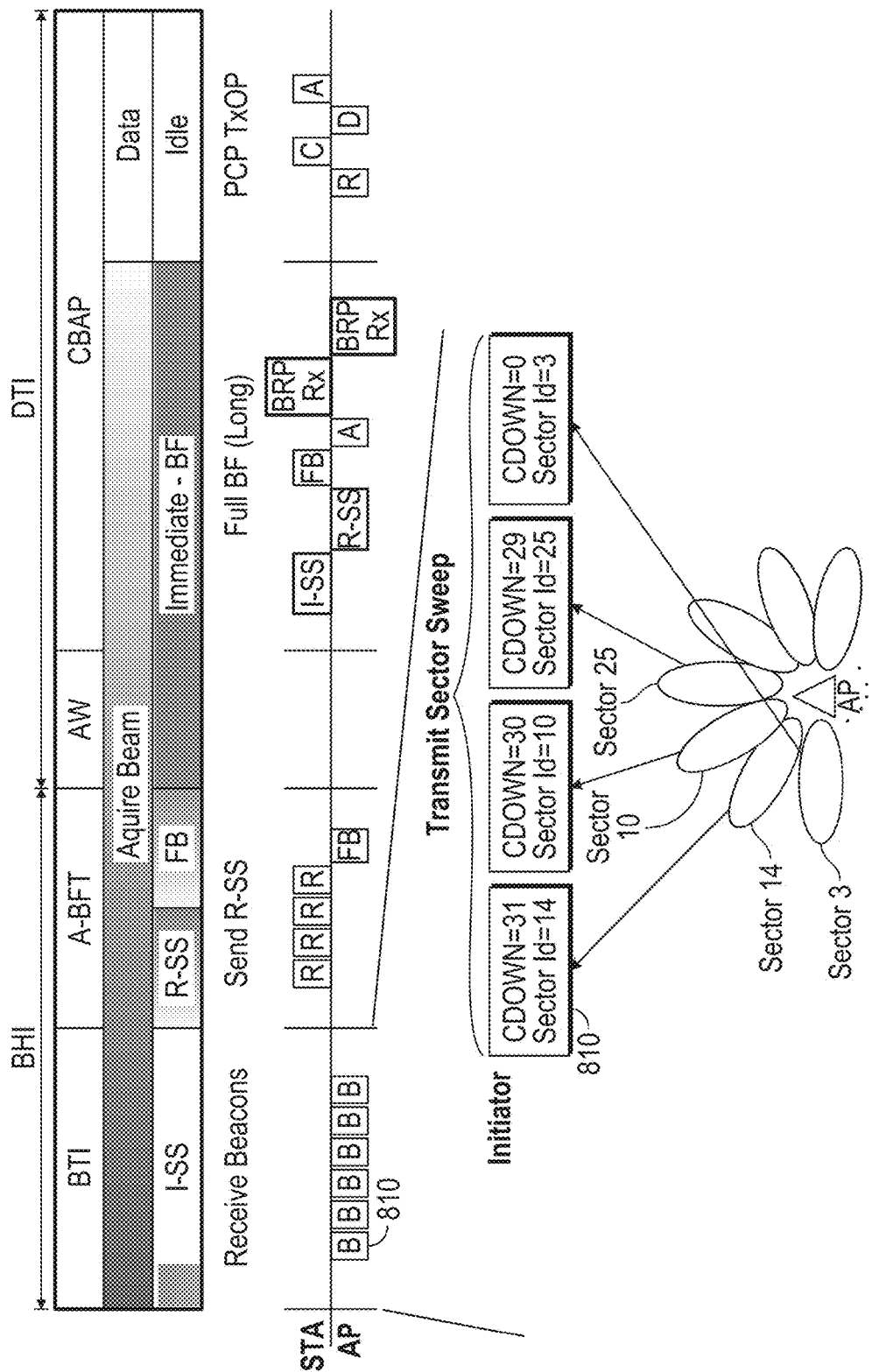
FIG. 8 illustrates details of an example sector sweep procedure.

For achieving the beam-forming gain, 802.11ad defined a procedure for 2 entities to train their antenna configurations against each other. This procedure is referred to as a Sector Level Sweep (SLS). As illustrated in FIG. 8, every Beacon Transmission Interval (BTI), an AP initiates a SLS as ISS (Initiator Sector Sweep), which involves transmitting data (beacons 810) on different sectors (in different directions). As illustrated, each beacon 810 may include a countdown value indicating a number of sectors in a sweep remain after a sector associated with (used to transmit) the current frame (indicating how many beacons remain in the BTI) and is enumerated to allow a station to detect and report the sector to be used. For example, in this example, sector 25 may be selected as it may be near line of site (LOS), which may be detected, for example by a higher receive signal strength for the beacon 810 sent on that sector.

Example passive positioning based on directional transmissions

As described above, passive positioning generally assumes that the SAP and mobile (STA) have the ability to receive the APi transmitted signal and to measure TOA for that signal. This assumption may be correct in 2.4/5 GHz networks, where participants inherently utilize omni-directional transmission. For example, the call flow depicted in FIG. 6 assumes that SAP initiates a FTM session with APi, and that the mobile measures TOA of the APi->SAP message of this RTT measurement.

As stated above, however, 802.11ad practices directional communication, and the transmit side transmits a directional signal. As a result, assuming the NW topology and flows for PP discussed above, a mobile may not be able to measure the TOA of the same AP TOD instance that the SAP does (due to different positions of the SAP and mobile, and directionality of the transmission instances).

Figure 9:
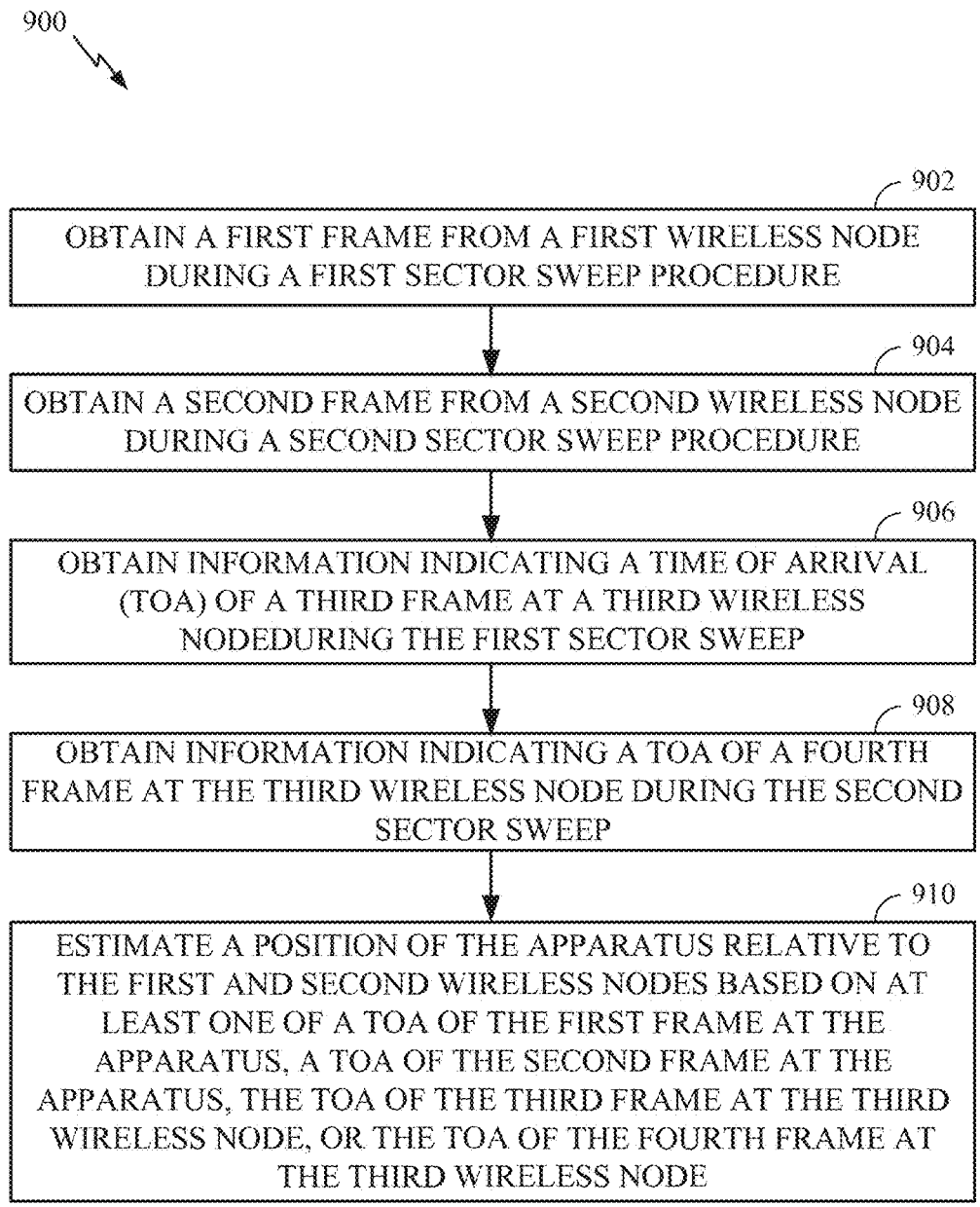
FIG. 9 illustrates example operations for passive positioning by a station, in accordance with aspects of the present disclosure.

Aspects of the present disclosure, however, provide techniques for passive positioning using directional transmissions. FIG. 9 illustrates example operations 900 that may be performed, for example, by a mobile device (station) for passive positioning using directional transmissions. The operations 900 begin, at 902, by obtaining a first frame from a first wireless node (e.g., AP1) during a first sector sweep procedure. At 904, the station obtains a second frame from a second wireless node (e.g., AP2) during a second sector sweep procedure. At 906, the station obtains information indicating a time of arrival (TOA) of a third frame at a third wireless node (e.g., the SAP) during the first sector sweep. At 908, the station obtains information indicating a TOA of a fourth frame at the third wireless node during the second sector sweep. At 910, the station estimates a position of the apparatus relative to the first and second wireless nodes based on at least one of a TOA of the first frame at the apparatus, a TOA of the second frame at the apparatus, the TOA of the third frame at the third wireless node, or the TOA of the fourth frame at the third wireless node.

Figure 10:
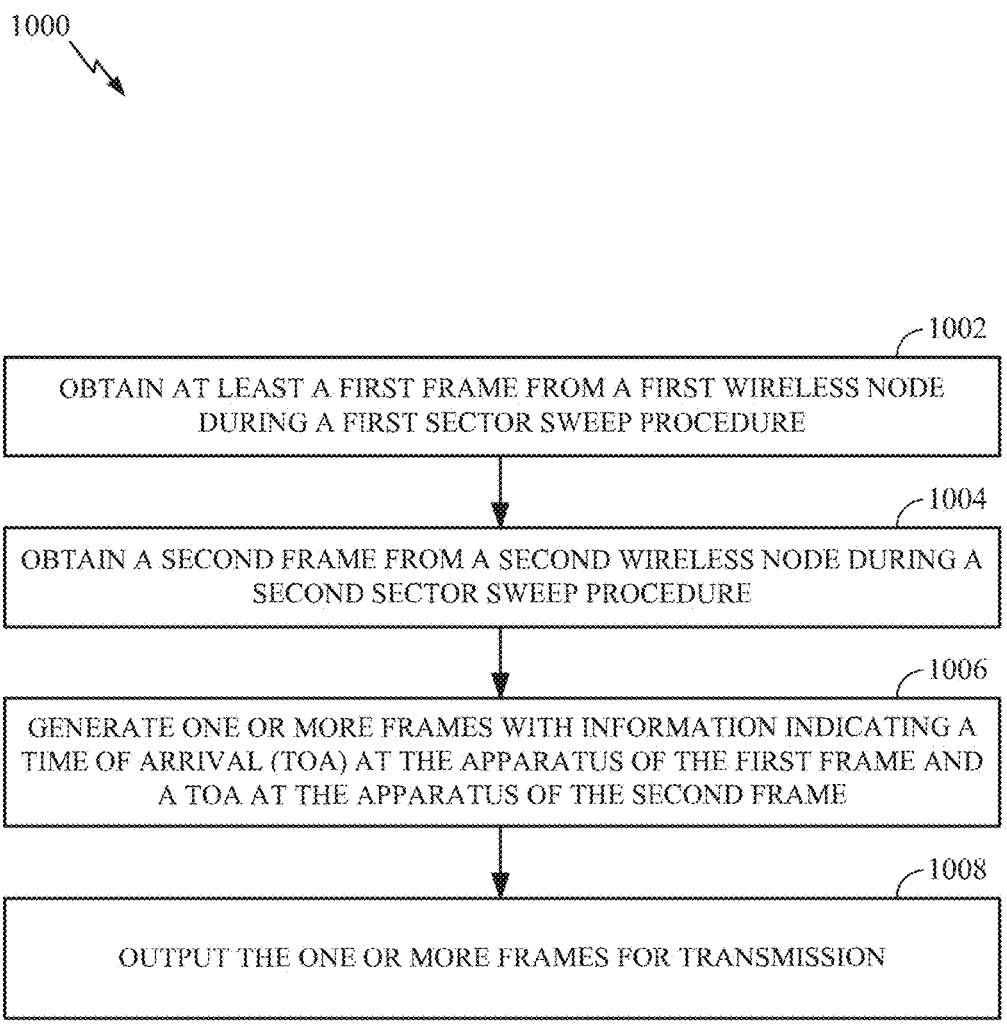
FIG. 10 illustrates example operations for passive positioning by a supervising access point, in accordance with aspects of the present disclosure.

FIG. 10 illustrates example operations 1000 that may be performed, for example, by an SAP to assist in passive positioning using directional transmissions. The operations 1000 begin, at 1002, by obtaining at least a first frame from a first wireless node during a first sector sweep procedure. At 1004, the SAP obtains a second frame from a second wireless node during a second sector sweep procedure. At 1006, the SAP generates one or more frames with information indicating a time of arrival (TOA) at the apparatus of the first frame and a TOA at the apparatus of the second frame. At 1008, the SAP outputs the one or more frames for transmission.

According to certain aspects, passive positioning based on directional transmissions (e.g., performed by a STA and SAP acting according to operations 900 and 1000 described above), may utilize an existing BTI sector sweep procedure for measuring TOA by mobile and SAP on agreed instances. Upon reception of this agreed beacon instance, the SAP and mobile may perform measurements as follows:

SAP a) SAP measures $TOA_{SAP}{}^i$ and stores CDOWN-annotated $CDOWN_{SAP}{}^i$ of the best Tx sector transmitted by APi
b) SAP estimates relative ppm w.r.t $APi-\hat{\partial}_{SAP}{}^i$
c) Reports collected $CDOWN_{SAP}{}^i$ and $\hat{\partial}_{SAP}$, preferably in a broadcast manner (other bands can be used) or per request.

Mobile d) Mobile measures and stores $TOA_{mob}{}^i$ and $CDOWN_{mob}{}^i$ of the best received AP Tx sector
e) estimates relative ppm w.r.t $APi-\hat{\partial}_{mob}{}^i$
f) Receives SAP measured data $-TOA_{SAP}{}^i$, $CDOWN_{SAP}{}^i$ and $\hat{\partial}_{SAP}$ Based on these measurements, a double difference measurement, $DD_i{}^{meas}$ may be made as described below.

For one example procedure, it may be assumed that there are no significant time drifts between the (internal clocks) of actors of the system. In other words, it may be assumed that all the clocks of reference APs (APi), SAP, and mobile are synchronized. This scenario is described with reference to FIG. 11, which shows an SAP and mobile device taking passive measurements from directional transmissions from two reference APs, AP1 and AP2.

Figure 11:
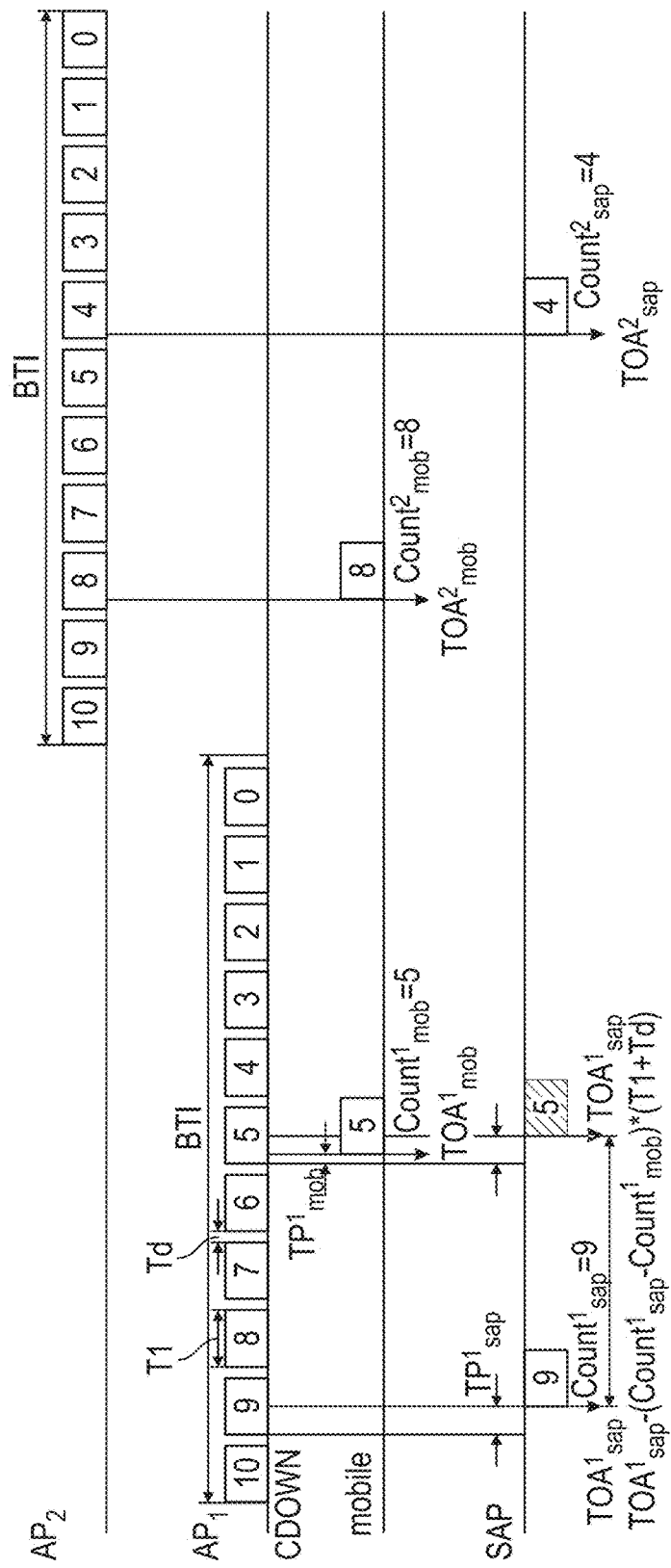
FIG. 11 is a timing diagram illustrating passive positioning, in accordance with certain aspects of the present disclosure.

As illustrated in FIG. 11, AP1 and AP2 sector level sweep (SLS) can be seen during their beacon transmission interval (BTI). Their measurement/transmission instances may be agreed upon, for example, via standardized rules or coordinated by the SAP. The BTI for AP1 is shown on the left, while the BTI for AP2 is shown on the right. In the illustrated example, for the AP1 BTI, a beacon with countdown 5 is used for measurement by the mobile STA, while a beacon with countdown 9 is used by the SAP. For the AP2 BTI, a beacon with countdown 8 is used for measurement by the mobile STA, while a beacon with countdown 4 is used by the SAP. Because of the directivity of the beacon transmissions, the SAP may not receive any signal in the Countdown SSW frame that the mobile station uses for measurement. Thus, these frames will be shown as with cross-hatching in FIGS. 11 and 12. As will be described below, however, the arrival time for these frames at the SAP may be estimated by the mobile STA. In other words, in the illustrated example, the SAP only provides TOA measurements for CD9 from AP1 and CD4 from AP2.

Operations at the SAP and mobile STA may be summarized as follows:

For BTI of AP1

SAP acquires beacon data on $TOA_{SAP}^1$, $CDOWN_{SAP}^1=9$
$TP_{SAP}^1$ is the propagation time from AP1 to SAP
Mobile STA acquires beacon data on $TOA_{mob}^1$, $CDOWN_{mob}^1=5$
$TP_{mob}^1$ is the propagation time from AP1 to mobile For BTI of AP2

SAP acquires beacon data on $TOA_{SAP}^2$, $CDOWN_{SAP}^2=4$
$TP_{SAP}^2$ is the propagation time from AP2 to SAP
Mobile STA acquires beacon data on $TOA_{mob}^2$, $CDOWN_{mob}^2=8$
$TP_{mob}^2$ is the propagation time from AP2 to mobile Upon reception of $TOA_{SAP}^i$, $CDOWN_{SAP}^i$ data from SAP by mobile, mobile can estimate $\widehat{TAO}_{SAP}^i$ which represents the calculated TOA of APi at the same $CDOWN_{mob}^i$ instance as follows:

$$\widehat{TAO}_{SAP}^i = (CDOWN_{SAP}^i - CDOWN_{mob}^i) * (T1 + T_{LBIFS}) + TAO_{SAP}^i$$

Where:
T1—represents the duration of a BF frame (assumed to be known)
$T_{LBIFS}$—represents the time between BF frames (assumed to be known)

Figure 12:
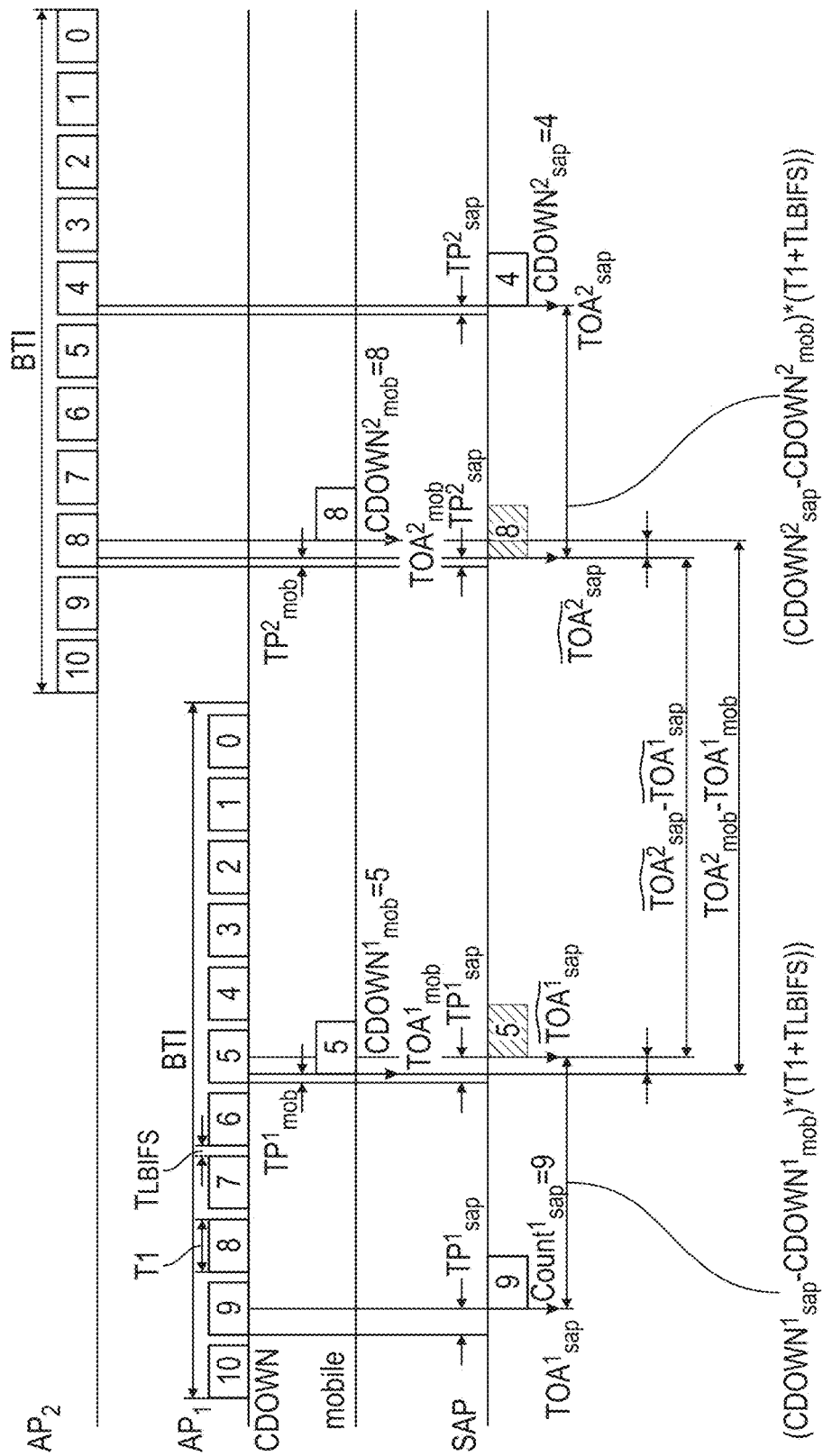
FIG. 12 is a timing diagram illustrating example double difference calculations, in accordance with certain aspects of the present disclosure.

FIG. 12 illustrates these measured parameters. Once $\widehat{TAO}_{SAP}^i$ is estimated $DD_i^{meas}$ can be calculated:

$$DD_i^{meas} = c(\widehat{TAO}_{SAP}^i - \widehat{TOA}_{SAP}^0) - c(TOA_{mob}^i - TOA_{mob}^0)$$

As can be seen, in $DD_i^{meas}$ represents the sum of differences of propagation time Given that the time base of the mobile are not entirely accurate, and each actor has its own drift (which it is assumed to be constant for the measurement duration), in some cases, it may be desirable to compensate for these drifts. For this compensation, it may be assumed that the mobile station and SAP estimate their drifts $\hat{\partial}_{mob}^i$ and $\hat{\partial}_{SAP}^i$, with respect to the reference AP (APi) and that the SAP provides this estimation to mobile. The mobile station may, thus, have sufficient data for compensating for the drift. Assuming that SAP and APi are accurate, drive may be compensated for by first taking a sum and applying that to the double difference equation as follows:

$$\hat{\partial}_{mob} = \frac{1}{N}\sum_{i=0}^{N-1}\hat{\partial}_{mob}^i - \hat{\partial}_{SAP}^i$$

and updating the DD equation yields:

$$DD_i^{meas} = c(\widehat{TAO}_{SAP}^i - \widehat{TAO}_{SAP}^i) - c(1+\hat{\partial}_{mob})^{-1}(TOA_{mob}^i - TOA_{mob}^0).$$

Figure 13:
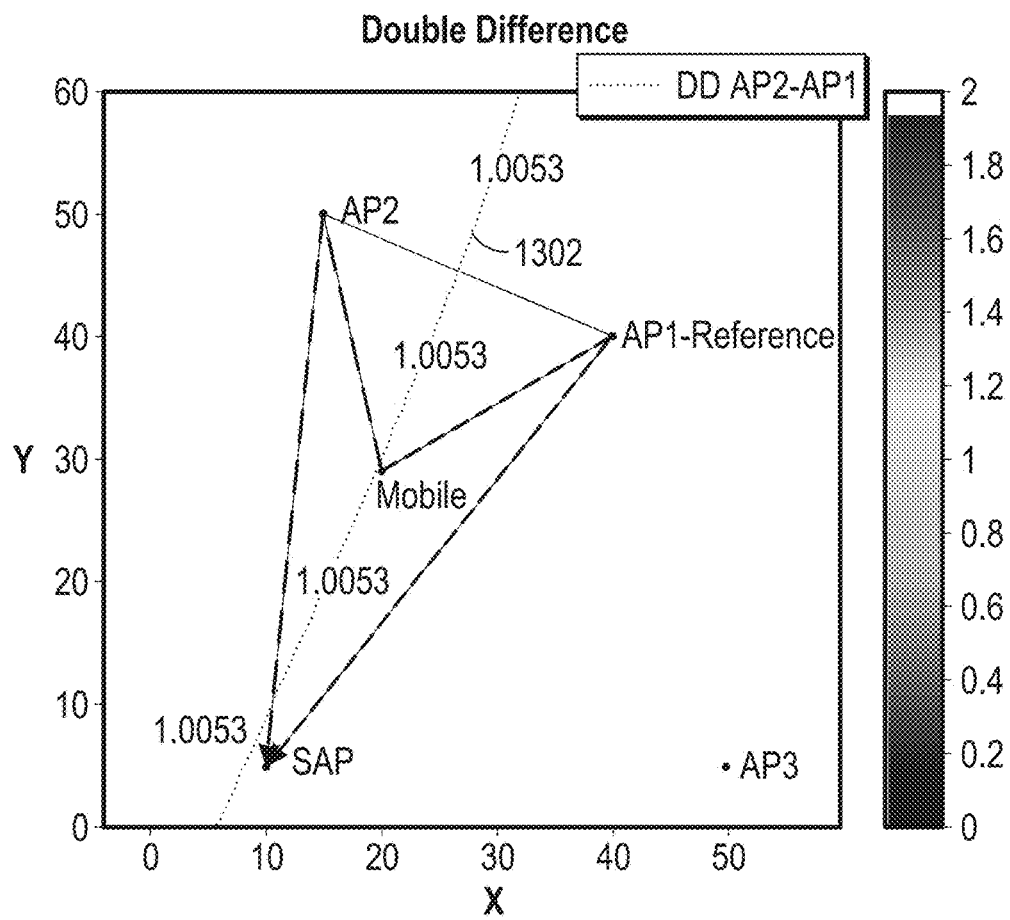
FIG. 13 is a plot illustrating a single double difference line for a first pair of access points (APs), in accordance with certain aspects of the present disclosure.

FIG. 13 is a plot showing the resulting DD line 1302 corresponding to possible positions of the mobile station based on the measurements taken for the example shown in FIGS. 11 and 12. As can be seen, $DD_i^{meas}$ represents the sum of differences of propagation from AP1 and AP2 to the mobile station.

Figure 14:
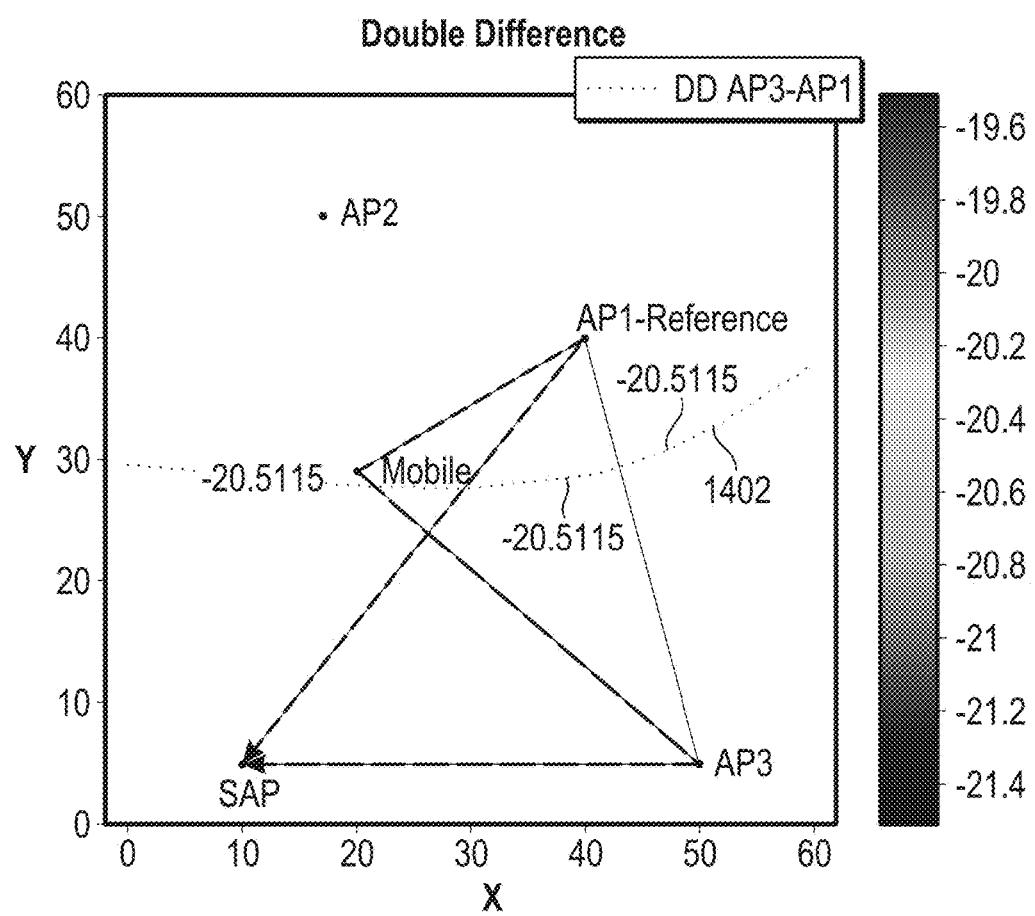
FIG. 14 is a plot illustrating a single double difference line for a second pair of access points (APs), in accordance with certain aspects of the present disclosure.
Figure 15:
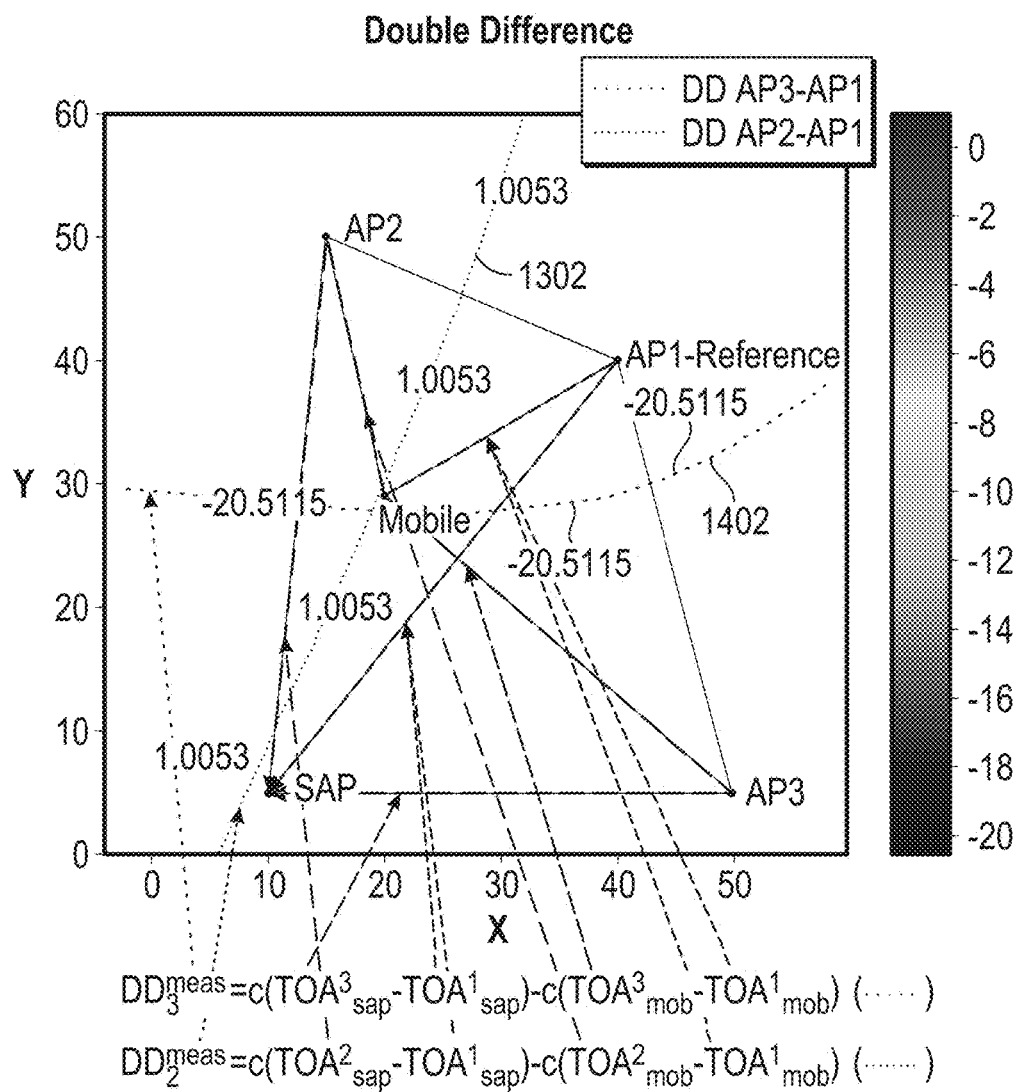
FIG. 15 is a plot illustrating how a station is positioned at an intersection between the double difference lines of FIGS. 13 and 14, in accordance with certain aspects of the present disclosure.

In order to estimate an actual position along the DD line 1302 for AP1 and AP2, the mobile station may perform the same passive positioning operations with a different pair of reference access points. For example, the mobile station may perform passive positioning with AP1 and AP3, resulting in the DD line 1402 shown in FIG. 14. As illustrated in FIG. 15, the mobile station may obtain an accurate estimate of its position based on an intersection 1502 of DD line 1302 and DD line 1402.

Once a position estimate is obtained, the mobile station may use it for various purposes (e.g., in navigation applications, to find services, etc.). In addition, or as an alternative, the mobile station may report its position to the network to be used for various purposes (e.g., location services, load balancing, and the like). Such reporting could include reporting absolute position information (e.g., determined based on two different DD measurements, as shown in FIG. 15) or could involve reporting relative position information (e.g., providing DD measurement information and allowing a network entity to determine an absolute position therefrom). Depending on the speed and accuracy, such position information may also be used in real-time applications, such as collision avoidance and the like.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission. In some cases, a single interface may be used to both receive (or obtain) and transmit (or output for transmission).

Figure 9A:
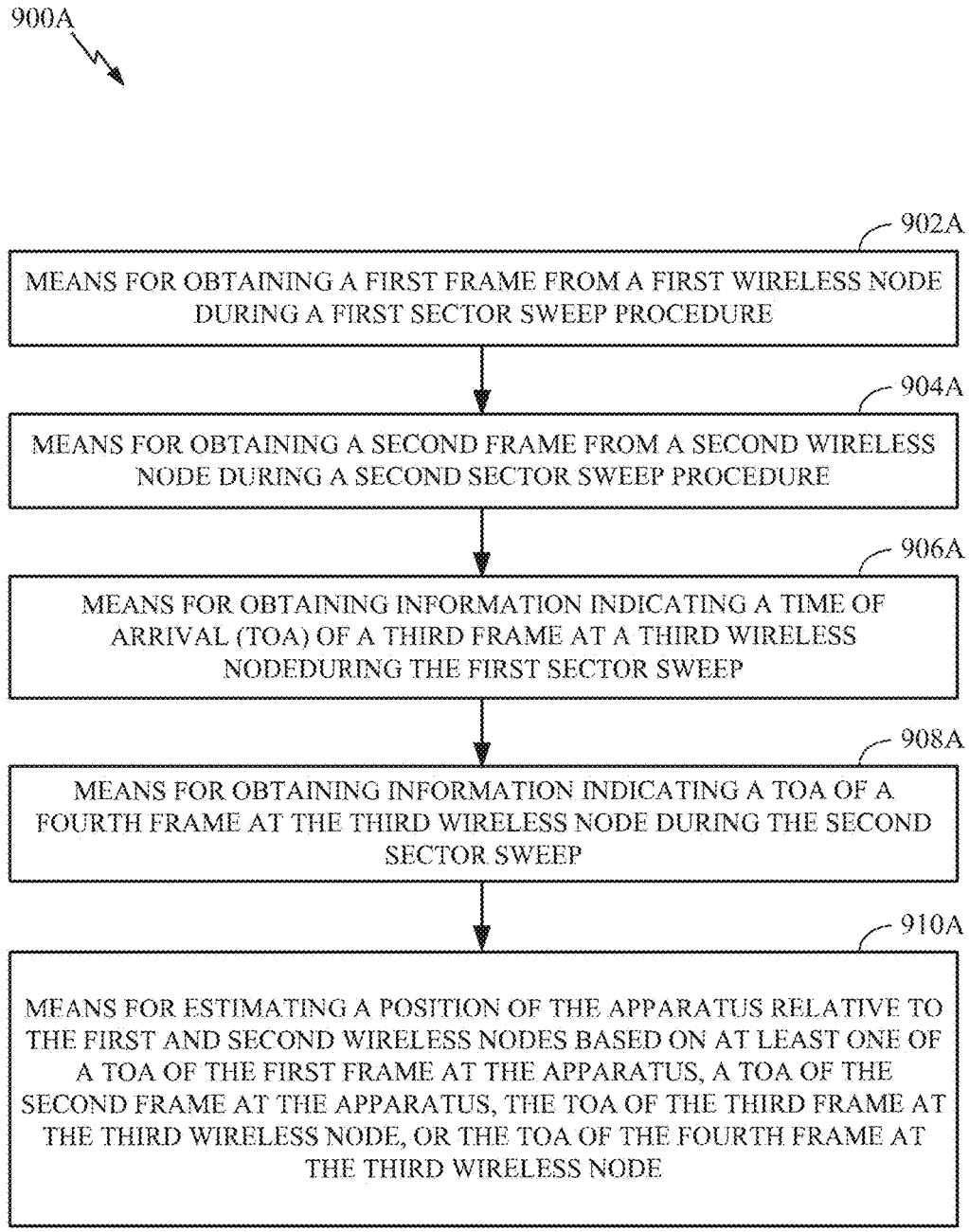
FIG. 9A illustrates example means capable of performing the operations shown in FIG. 9.
Figure 10A:
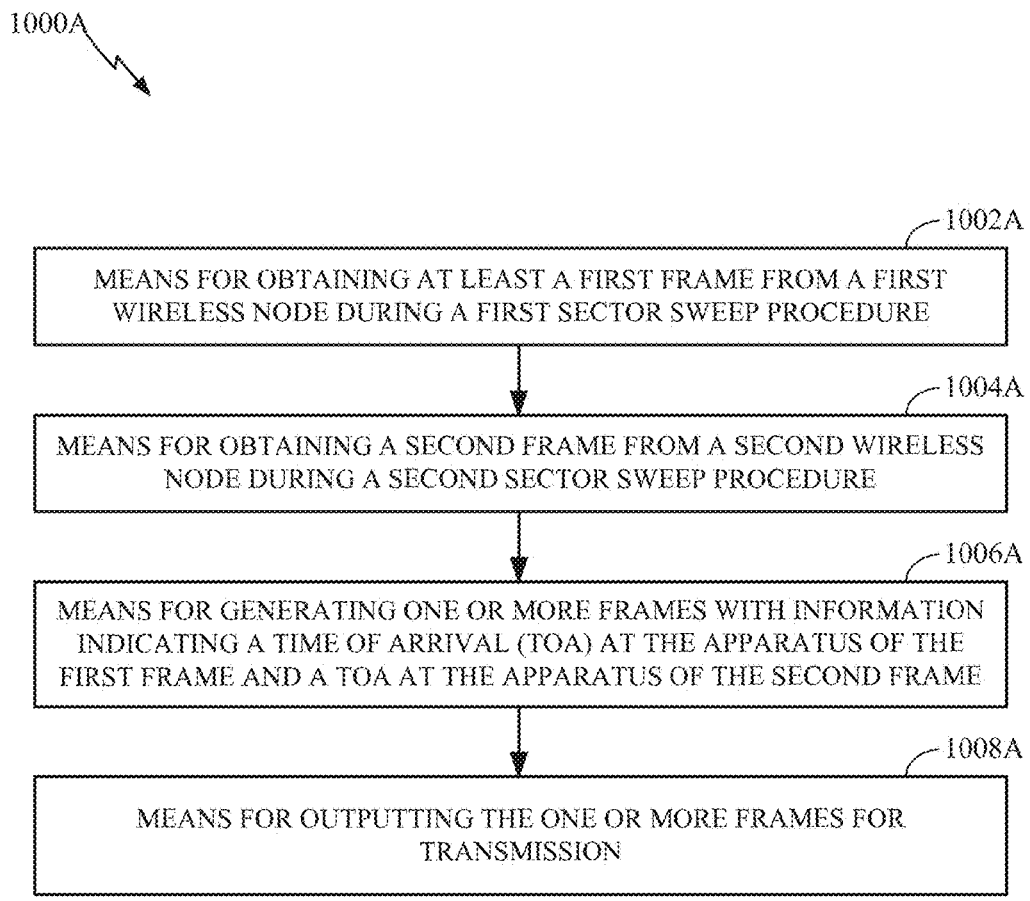
FIG. 10A illustrates example means capable of performing the operations shown in FIG. 10.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 and 1000 illustrated in FIGS. 9 and 10 correspond to means 900A and 1000A illustrated in FIGS. 9A and 10A, respectively.

For example, means for receiving and means for obtaining may be a receiver (e.g., the receiver unit of transceiver 254) and/or an antenna(s) 252 of the STA 120 illustrated in FIG. 2 or the receiver (e.g., the receiver unit of transceiver 222) and/or antenna(s) 224 of access point 110 illustrated in FIG. 2. Means for transmitting and means for outputting may be a transmitter (e.g., the transmitter unit of transceiver 254) and/or an antenna(s) 252 of the STA 120 illustrated in FIG. 2 or the transmitter (e.g., the transmitter unit of transceiver 222) and/or antenna(s) 224 of access point 110 illustrated in FIG. 2.

Means for estimating, means for selecting, means for performing, means for generating, means for including, means for normalizing, means for adjusting, means for determining, and means for providing may comprise a processing system, which may include one or more processors, such as the RX data processor 270, the TX data processor 288, and/or the controller 280 of the STA 120 illustrated in FIG. 2 or the TX data processor 210, RX data processor 242, and/or the controller 230 of the access point 110 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a STA 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. Thus, certain aspects may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising: first interface configured to obtain:
   a first frame from a first wireless node;
   a second frame from a second wireless node;
   information indicating a time of arrival (TOA) of a third frame at a third wireless node; and
   information indicating a TOA of a fourth frame at the third wireless node;
   a processing system configured to:
   estimate a first position of the apparatus relative to the first and second wireless nodes based on at least one of a TOA of the first frame at the apparatus, a TOA of the second frame at the apparatus, the TOA of the third frame at the third wireless node, or the TOA of the fourth frame at the third wireless node; and
   generate a fifth frame including information regarding at least one of the first position or an absolute position estimated by the apparatus based on the first position; and a second interface configured to output the fifth frame for transmission.

2. The apparatus of claim 1, wherein:
the first frame includes a first counter value indicating a number of sectors remaining in a first sector sweep involving the apparatus;
the second frame includes a second counter value indicating a number of sectors remaining in a second sector sweep involving the apparatus;
the first interface is further configured to obtain a third counter value indicating a number of sectors remaining in the first sector sweep after a sector associated with the third frame and a fourth counter value indicating a number of sectors remaining in the second sector sweep after a sector associated with the fourth frame; and
the estimation of the first position is further based on the first counter value, the second counter value, the third counter value, and the fourth counter value.

3. The apparatus of claim 1, wherein the processing system is further configured to:
estimate a second position of the apparatus relative to a pair of wireless nodes, wherein the pair of wireless nodes does not include both the first and second wireless nodes; and
estimate the absolute position of the apparatus based on the first position and the second position.

4. The apparatus of claim 3, wherein the pair of wireless nodes comprises the first wireless node and a fourth wireless node.

5. The apparatus of claim 3, wherein:
the processing system is further configured to use the absolute position in an application running on the apparatus.

6. The apparatus of claim 3, wherein the estimation of the absolute position is further based on locations, known by the apparatus, of the first wireless node, the second wireless node, and the pair of wireless nodes.

7. The apparatus of claim 1, wherein:
the processing system is further configured to:
estimate a TOA of the first frame at the third wireless node based on the TOA of the third frame at the third wireless node, and
estimate a TOA of the second frame at the third wireless node based on the TOA of the fourth frame at the third wireless node; and
the estimation of the first position is further based on at least one of the estimated TOA of the first frame at the third wireless node or the estimated TOA of the second frame at the third wireless node.

8. The apparatus of claim 7, wherein the estimation of the first position of the apparatus relative to the first and second wireless nodes is further based on:
a difference between the estimation of the TOA of the second frame at the third wireless node and the estimation of the TOA of the first frame at the third wireless node; and
a difference between the TOA of the second frame at the apparatus and the TOA of the first frame at the apparatus.

9. An apparatus for wireless communication, comprising:
a first interface configured to obtain:
  a first frame during a first sector sweep procedure; and
  a second frame during a second sector sweep procedure;
a processing system configured to generate one or more frames with information indicating at least one of a time of arrival (TOA) of the first frame at the apparatus or a TOA of the second frame at the apparatus; and
a second interface configured to output the one or more frames for transmission.

10. The apparatus of claim 9, wherein the one or more frames further include at least one of:
  an indication of a first frame number indicating a position of the first frame relative to other frames transmitted during the first sector sweep procedure; or
  an indication of a second frame number indicating a position of the second frame relative to other frames transmitted during the second sector sweep procedure.

11. The apparatus of claim 9, wherein the one or more frames further include:
  an indication of a relative drift associated with two or more clocks of the apparatus and at least one of a first wireless node that transmitted the first frame or a second wireless node that transmitted the second frame.

12. The apparatus of claim 9, wherein the one or more frames are output for transmission as one or more broadcast frames.

13. A wireless station, comprising:
a receiver configured to receive:
  a first frame from a first wireless node;
  a second frame from a second wireless node;
  information indicating a time of arrival (TOA) of a third frame at a third wireless node; and
  information indicating a TOA of a fourth frame at the third wireless node;
a processing system configured to:
  estimate a first position of the wireless station relative to the first and second wireless nodes based on at least one of a TOA of the first frame at the wireless station, a TOA of the second frame at the wireless station, the TOA of the third frame at the third wireless node, or the TOA of the fourth frame at the third wireless node; and
  generate a fifth frame including information regarding at least one of the first position or an absolute position estimated by the wireless station based on the first position; and
a transmitter configured to transmit the fifth frame.

14. The apparatus of claim 9, further comprising:
a receiver configured to receive the first frame and the second frame; and
a transmitter configured to transmit the one or more frames, wherein the apparatus is configured as an access point.

* * * * *